No. 706,906. Patented Aug. 12, 1902.
M. T. DAVIS, Jr.
CAR WHEEL.
(Application filed May 19, 1902.)
(No Model.)
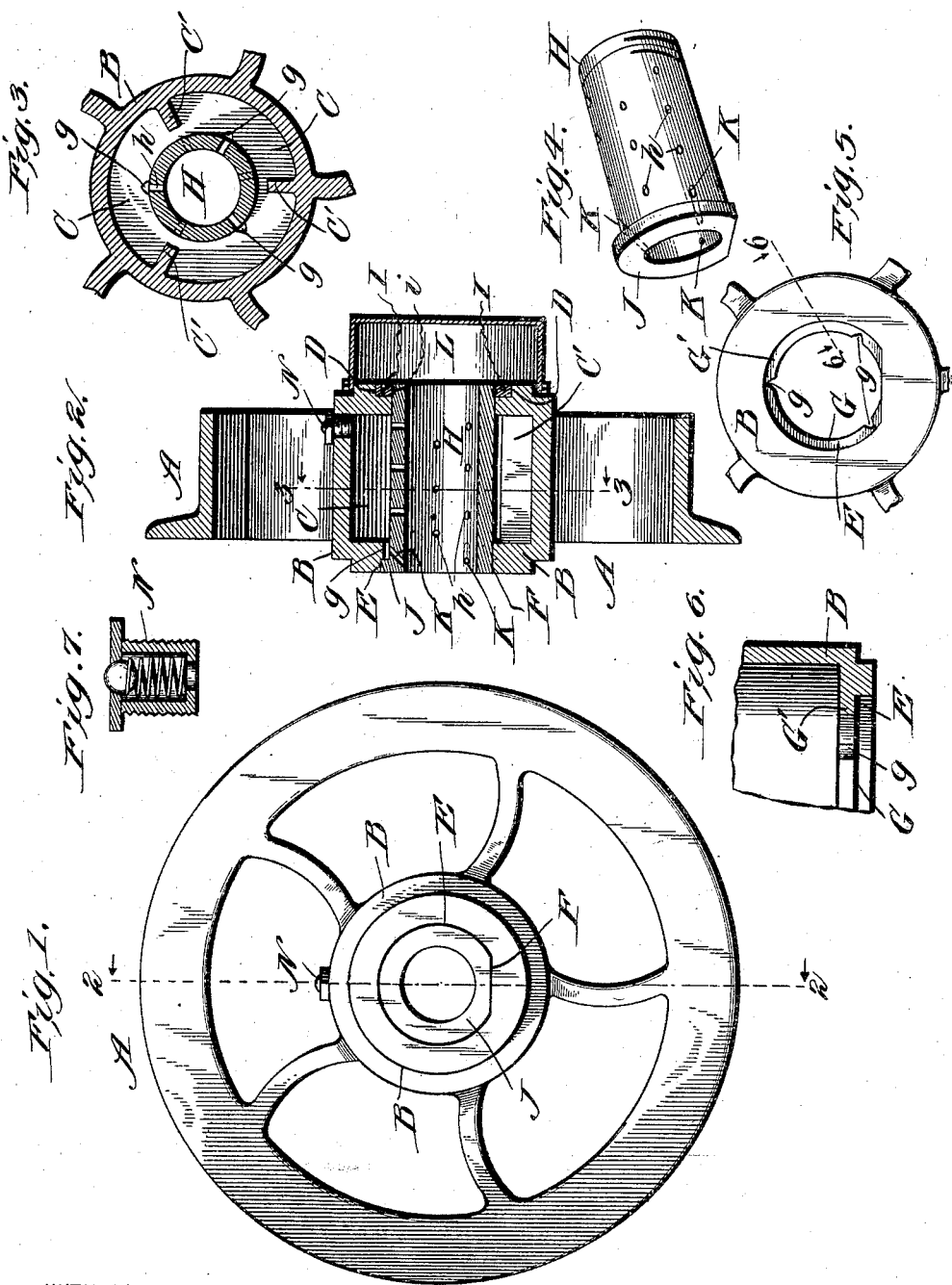
WITNESSES:
INVENTOR
Madison T. Davis, Jr.
BY
ATTORNEYS

UNITED STATES PATENT OFFICE.

MADISON T. DAVIS, JR., OF CHARLESTON, WEST VIRGINIA.

CAR-WHEEL.

SPECIFICATION forming part of Letters Patent No. 706,906, dated August 12, 1902.

Application filed May 19, 1902. Serial No. 107,936. (No model.)

*To all whom it may concern:*

Be it known that I, MADISON THENTON DAVIS, Jr., a citizen of the United States, residing at Charleston, in the county of Kanawha and State of West Virginia, have made certain new and useful Improvements in Car-Wheels, of which the following is a specification.

My invention is an improvement in car-wheels, and particularly in wheels designed for use in mines, and relates especially to the means for lubricating the said wheels, to which end the invention consists in certain novel constructions and combinations of parts, as will be hereinafter described and claimed.

In the drawings, Figure 1 is an elevation of the inner side of a car-wheel embodying my invention. Fig. 2 is a vertical section thereof on about line 2 2 of Fig. 1. Fig. 3 is a detail section on about line 3 3 of Fig. 2. Fig. 4 is a detail perspective view of the perforated tubular bushing. Fig. 5 is a detail elevation of the inner end of the hub of the wheel, the lubricating-bushing being removed. Fig. 6 is a detail section on about line 6 6 of Fig. 5, and Fig. 7 is a detail section illustrating the construction for permitting the filling of the lubricating-chamber.

The wheel A has its hub B formed with an annular chamber C for the lubricant, ribs or flanges C' being arranged to project into said chamber from the outer side thereof to agitate the oil or other lubricant, as desired. At its opposite ends the hub is provided in its outer faces with rabbets D and E, the outer rabbet D being in the form of an annular groove to receive the nut for securing the bushing presently described, while the rabbet E at the inner end of the hub has a flat side F, which coincides with a flat side on the end flange of the lubricating-bushing and prevents the latter from turning. The rabbet E, in addition to receiving the head of the tubular bushing, also provides a shoulder G, against which the said head seats, said shoulder being afforded by the inwardly-projecting flange G', formed in the hub, as shown in Figs. 2, 5, and 6. This flange G' is provided at intervals with the notches g, which extend from the inner to the outer face of the said flange and afford passages for the lubricating material to the openings in the lubricating-bushing, whereby the lubricant is supplied to the extreme inner end of the wheel.

The tubular bushing H is provided with numerous perforations h along its inner portion, is threaded at one end i to receive the nut I, has at its opposite end a head or flange J, and is provided near its headed end with the perforations K, whose inner ends open within the bushing close to the inner end thereof, while the outer ends of the perforations K open within the flange G', in register with the notches g, produced in the inner edge thereof. It will be understood that it is important to provide for lubricating the wheel at the extreme inner end thereof, and this I accomplish by the notched construction of the stop-flange G' and by perforating the tubular lubricating-bushing in register with said notches, said perforations extending in position to discharge the lubricant at the inner end of the wheel. I thus combine the devices to secure the stopping of the bushing in the desired positon for the delivery of the lubricating material at the inner end of the wheel, as desired. The nut I fits on the threaded end i of the lubricating-bushing and seats in the rabbet or groove D in the outer end of the hub, thus presenting a smooth surface at the outer end of the hub. It will also be noticed that the inner end of the lubricating-bushing coincides with and forms a flush finish at the inner end of the hub.

A cap L may be fitted on the outer end of the hub, and means may be provided at N for supplying the lubricating material to the annular chamber of the hub whenever occasion requires.

It will be noticed the tubular bushing can be readily removed and another inserted when the parts are worn.

Having thus described my invention, what I claim as new, and desire to secure by Letters Patent, is—

1. The improvement in wheels herein described, comprising the hub having an annular chamber for the lubricant, and provided in its outer end with a rabbet for the nut and at its inner end with a rabbet non-circular in cross-section, with a stop-flange at the inner end of the rabbet and provided in its inner edge with notches for the passage of the lubricant, the perforated tubular bushing provided at its middle portion with perforations for the passage of the lubricant, threaded at its outer end to receive the securing-nut and provided at its inner end with a head to fit in the rabbet at the inner end of the hub and having adjacent to said head perforations registering at their outer ends with the notches in the stop-flange of the hub and opening at their inner ends adjacent to the inner end of the lubricating-bushing, and the nut on the threaded end of the lubricating-bushing, substantially as set forth.

2. The combination with the hub having the chamber for the lubricant, and provided at its inner end with an inwardly-projecting flange notched in its inner edge, and the lubricating-bushing having at its inner end a head abutting said flange and provided adjacent to said head with perforations which register at their outer ends with the notches in the flange of the hub, and discharge at their inner ends adjacent to the inner end of the bushing, substantially as set forth.

3. The combination with the hub provided in its inner side with a rabbet for the head of the bushing, said rabbet having a non-circular portion and at its inner side a stop-flange provided in its inner edge with notches, and the lubricating-bushing provided at its inner end with a head to fit the rabbet in the hub and having adjacent to said head perforations which register at their outer ends with the notches in the stop-flange and open at their inner ends adjacent to the inner end of the lubricating-bushing, substantially as set forth.

MADISON T. DAVIS, Jr.

Witnesses:
MADISON T. DAVIS,
ENOCH CARVER.